United States Patent [19]
Blom et al.

[11] Patent Number: 5,446,628
[45] Date of Patent: Aug. 29, 1995

[54] FLEXIBLE FIBRE OPTIC SYSTEM FOR BICYCLE ILLUMINATION

[76] Inventors: Richard P. Blom, 6301 Honolulu Ave. 39; Robert J. Hauerwaas, 10125 Gish Ave., both of Tujunga, Calif. 91042

[21] Appl. No.: 210,166

[22] Filed: Mar. 17, 1994

[51] Int. Cl.⁶ .................................................. F21V 7/04
[52] U.S. Cl. ...................................... 362/32; 362/72
[58] Field of Search .................... 362/32, 72; 385/115

[56] References Cited
U.S. PATENT DOCUMENTS 3,766,374  10/1973  Fairchild ............................... 362/32
4,573,761   3/1986  McLachlan et al. ................. 385/115
5,193,893   3/1993  Mitko ..................................... 362/32
5,321,586   6/1994  Hege et al. ............................ 362/32

*Primary Examiner*—Carroll B. Dority
*Attorney, Agent, or Firm*—Wagner & Middlebrook

[57] ABSTRACT

A flexible light transfer conduit for use in combination with a light source of the type having a plastic heat shrink tubing that is shrunk around a core of flexible fiber optic rod(s) of varying diameters, along with a wire stiffening element that is capable of holding the cable in a position it is bent to without fracturing after repeated bends.

10 Claims, 3 Drawing Sheets

FLEXIBLE FIBRE OPTIC SYSTEM FOR BICYCLE ILLUMINATION

FIELD OF THE INVENTION

This invention is related to bicycles, in particular, a bicycle product for use at night for illumination purposes.

BACKGROUND OF THE INVENTION

Up until now, manufacturers of illumination products for bicycles incorporate a system driven by a source of electricity, either a battery or generator. Typically, a handle bar mounted headlight is provided and sometimes a separate tail light is mounted on the frame near the seatpost or saddle and faces rearward with a red lens. Often reflectors are used on the bicycle pedals and on the rear to provide a bright reflection off oncoming lights of approaching vehicles.

All lighting systems require a source of power. In some cases, the addition of auxiliary, e.g. tail lights, increases power consumption and reduces light from headlight operation time. Mounting and wiring can be awkward and in the end, aesthetically unacceptable. Also, electric components are susceptible to breakage. They will require eventual bulb replacement and constantly draw power when in use. Self contained tail lights (that hold their own batteries) do not perform as well as other types. Moisture is also a constant threat for these types of electrical components. Current manufacturer's tail lights are housed in enclosures varying in size and shape that may detract from the bicycle's appearance. With added weight and awkward appearance, there is room for improvement.

With the increase in the popularity and necessity of bicycle riding at night, other illumination needs become apparent. Bicycle computers, mounted on the handlebars provide vital information to the riders such as time, speed, distance, maximum and average speed, cadence, altitude, and sometimes, the rider's heart rate. Illumination for bicycle computers (normally located on the bicycle handlebars and equally important for night riding) is non existent, and currently is not addressed by manufacturers of either computers or lighting systems. The limited size of bicycle computers and battery requirements for putting a light inside a computer have not been developed.

Other desirable illumination needs not addressed until now include, side lighting for cross-traffic safety, shifter or derailleur illumination for viewing the derailleurs and tail lighting for rear visibility.

Although fiber optics are used in almost all segments of society, from automobiles, aerospace, commercial and residential construction and communications, dental and medical fields, we believe the introduction of fiber optics for illumination purposes is completely new to field of bicycling. Therefore, the comparison of this invention to current bicycle products will demonstrate how properly designed and located, fiber optics will effectively improve bicycle riding at night.

In summary of the state of the art:

a) The current tail lights may require batteries and bulbs and will need to be replaced based on the conditions and number of hours ridden at night. This means the overall lifetime cost to operate increases as it is used.

b) With the conditions surrounding bicycle lighting, shock and vibration, water and moisture, fragile wires and lamp housings are subject to breakage and short circuits.

c) These types of electrical components require extensive manufacturing facilities which are costly and require mass runs to offset investment.

d) Unfortunately most present designs that are available generally detract from the appearance of the bicycle.

e) In general, there are illumination needs that cannot be met using the current technology.

g) Existing bicycle lighting systems lack flexibility in their ability to provide illumination wherever required.

OBJECTS AND ADVANTAGES

We propose to utilize head lamp illumination via fiber optics to provide virtually all needed bicycle illumination.

Accordingly, the many objects and advantages of transferring light from the headlight through flexible fiber optics cable for illumination purposes are:

a) To provide a bicycle tail light illumination products that require no additional batteries, bulbs or wiring beyond the normal head lamp resulting in minimal operating costs;

b) To provide bicycle illumination products that require minimum ease of installation by the owner, and for the producers, easy set up and low manufacturing costs;

c) To provide a bicycle product that is durable, will last indefinitely, and can be covered by a meaningful limited lifetime warranty;

d) To provide an illumination system for bicycles that is virtually unseen and thus aesthetically acceptable;

e) To provide illumination products not currently made, out of fiber optics, that will enhance safety and enjoyment of riding at night.

Further objects and advantages are to provide an illumination system that can be used with any bicycle equipped with a headlight, that generates no heat, uses existing light, therefore consumes no additional power and offers extreme durability which can be used indefinitely with little if any maintenance, which is inexpensive to manufacture in any length, in different colors and with any specific number of fiber optic rods.

f) To offer an inexpensive, light weight and effective way to illuminate other areas on a bicycle that have not been addressed until now;

g) Can be made to fit any desired bicycle requirements without remanufacturing costs; and h) Is totally resistant to all of the elements a night rider may encounter.

BRIEF DESCRIPTION OF THE INVENTION

This invention involves a fiber optic system employing a number of flexible optical element(s), deformable positioning member(s) and retainers which direct illumination from a bicycle headlight to various places where light is needed.

The fiber optic element(s) are shielded in tubular sleeves to protect them from damage. The deformable positioning element(s) preferably are wire(s) contained within the sleeve(s) and bendable to direct the fiber optic element(s) to the required direction and position. The retainers are individual flexible straps which fasten the fiber optics on the bicycle.

BRIEF DESCRIPTION OF THE DRAWING

This invention can be more clearly understood from the following detailed description and by reference to the drawings in which.

DETAILED DESCRIPTION OF THE INVENTION

Figure 1:
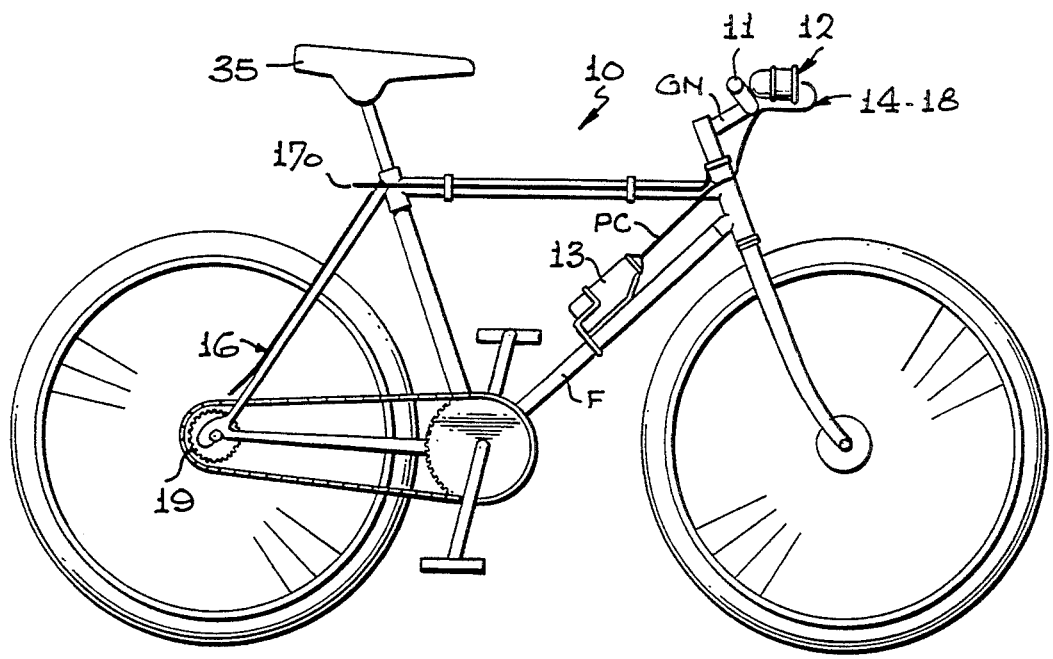
FIG. 1 is a side elevational view of a bicycle mounted with this invention.

Now referring to the drawings, FIG. 1 show a conventional modern competition type bicycle generally designated 10 including handlebars 11 carrying a head lamp 12 powered by a battery pack 13 secured to the frame F of the bicycle.

Power from the battery pack 13 is conveyed via power cord PC to the head lamp 12. This is the only power required to provide all of the illumination used in connection with this invention. Viewing FIG. 1 in combination with FIGS. 2 and 3, it may be seen that directly in front of head lamp lens 12L is a number of fibre optic elements 14–18.

Figure 3:
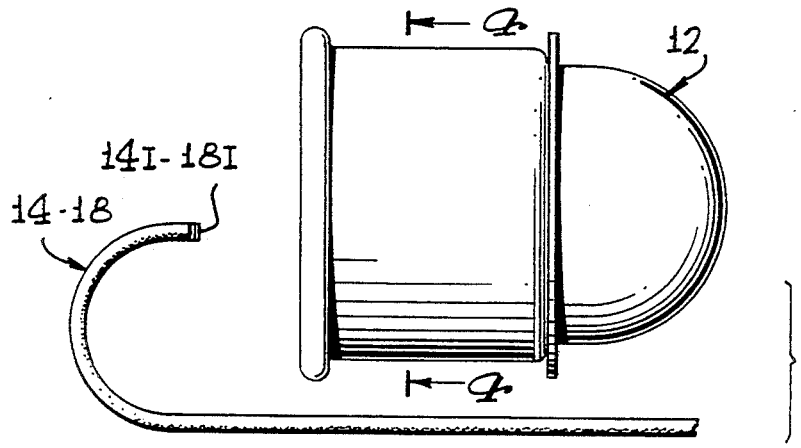
FIG. 3 is an enlarged side elevational view of a bicycle headlight showing the input end of a fiber optic element of this invention.

It may be seen that these fibre optic elements 14–18 are curved forward with their input ends 14I–18I of FIG. 3 exposed to the illumination from the head lamp 12 via the lens 12L. Fibre optic elements 14–18 may be strategically attached to points on the brake or shift cables that have little or no movement and do not interfere with their operation and may also be attached to the handlebar, gooseneck, GN headlight or other needed areas.

Figure 4:
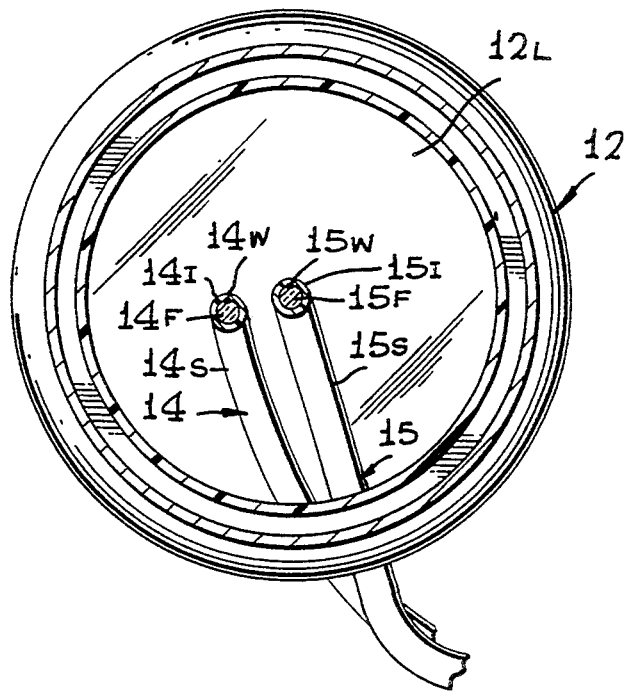
FIG. 4 is an enlarged end view of the input end of a preferred embodiment of (2) fibre optic elements in accordance with this invention.

Now referring to FIG. 4, it may be seen therein that the fibre optic element(s) 14 is actually comprised of a glass or plastic optic filament 14F surrounded by a sheath 14S enclosing not only the filament 14F but a wire stiffener member 14W. Similarly, fibre optic element 15 includes a sheath 15S, glass or plastic optic filament 15F and a positioning wire 15W. The sheathes 14S and 15S are preferably heat shrinkable tubing such as vinyl or polyolefin material usually black or at least opaque in color. The stiffener 14W or 15W constitutes galvanized steel (or equivalent) wire of 16 to 18 gauge. The wires W are easily deformed in to what ever shape is desired and has sufficient stiffness to remain in any deformed shape indefinitely or until moved. The deforming can easily be done by hand. A practical minimum radius for bends is 1"–1.5"

Figure 5:
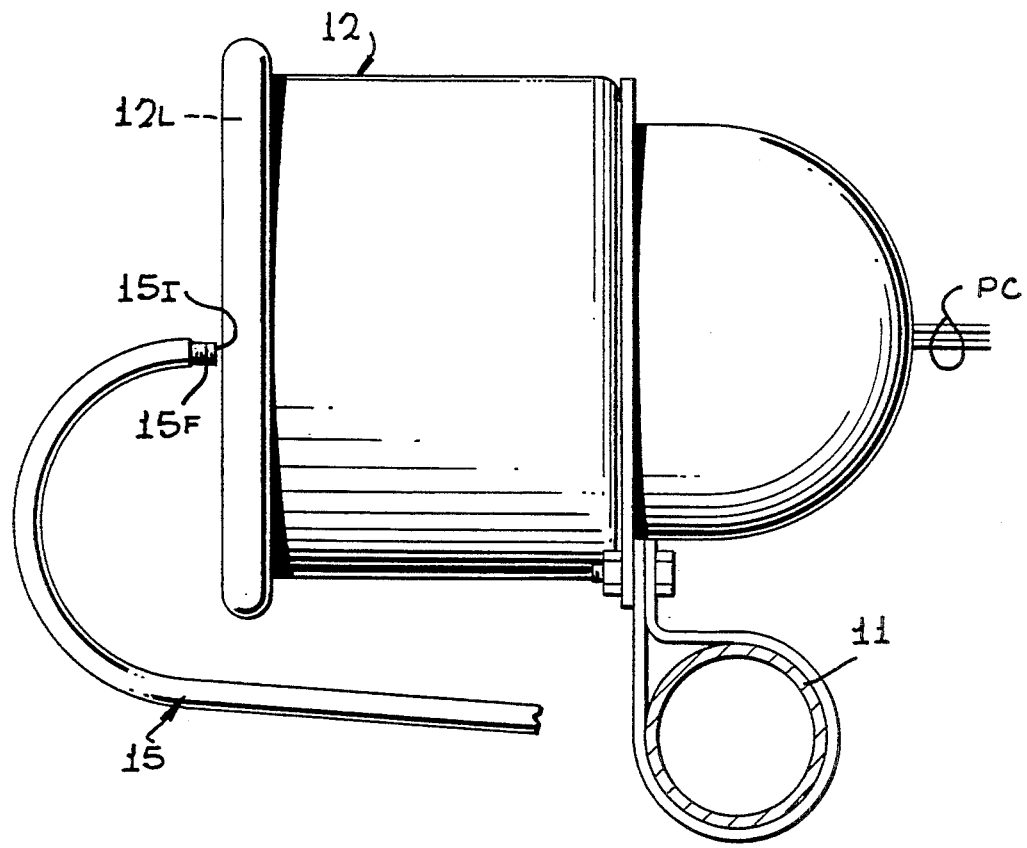
FIG. 5 is an enlarged side view of the lamp of FIG. 3 with the input of a computer fibre optic cable in accordance with this invention is more visible.

As shown in FIG. 5, optical filament(s) 15F extends slightly out of the end of sheath 15S. The exterior circular surface is sufficiently polished to allow entering light to the be transferred through internal reflections without significant loss of illumination. (As normal, in the fibre optics field) rods or wires of plastic or glass with light transfer characteristics provide nearly lossless transmission of light for significant distances:

MATERIAL CHARACTERISTICS

The amount of light that a fibre optic transmits is influenced by many factors. Typical variables are the material used, quality of fused interface between the core and clad and the quality of the end finishing as well as the assembly of the device. There are no industry standards for measuring light transmission of a completed device. Consequently, the supplier and the manufacturer usually work together to determine what the requirements are and what optic rods will meet these requirements. A typical 0.002 mil fiber will have a light transmission on the order of 60–65%. Our research has shown that glass and plastic of a (0.006 inch) 60 mil optic rod is capable of providing the necessary illumination needed as well as maintaining a deformed minimum radius of 1 to 1.5 inches.

Figure 2:
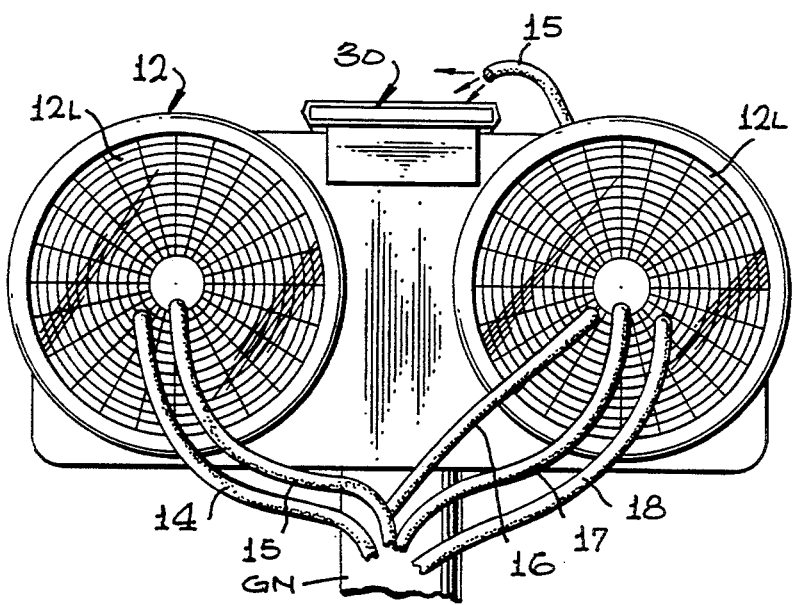
FIG. 2 is an enlarged front elevational view of the headlight of FIG. 1 showing the positioning of the input ends of fiber optic elements of this invention.
Figure 6:
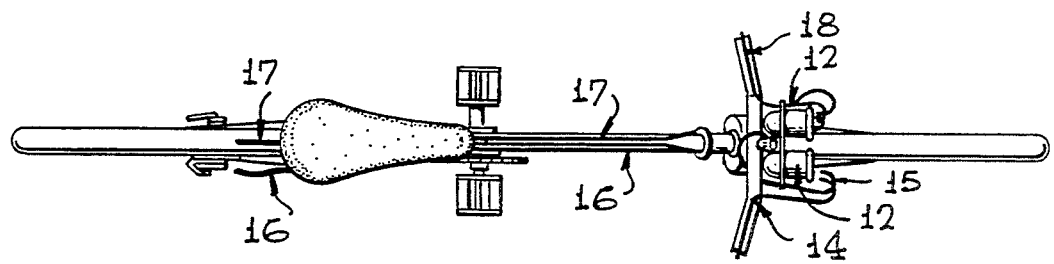
FIG. 6 is a top plan view of a bicycle incorporating this invention in each of its preferred positions.
Figure 6A:
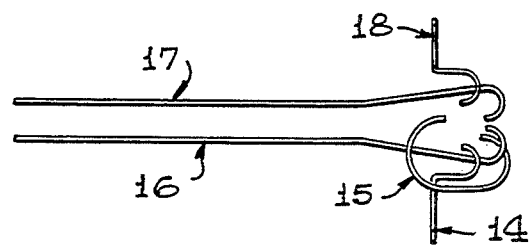
FIG. 6A is a simplified view of the fibre optic elements of FIG. 6.
Figure 7:
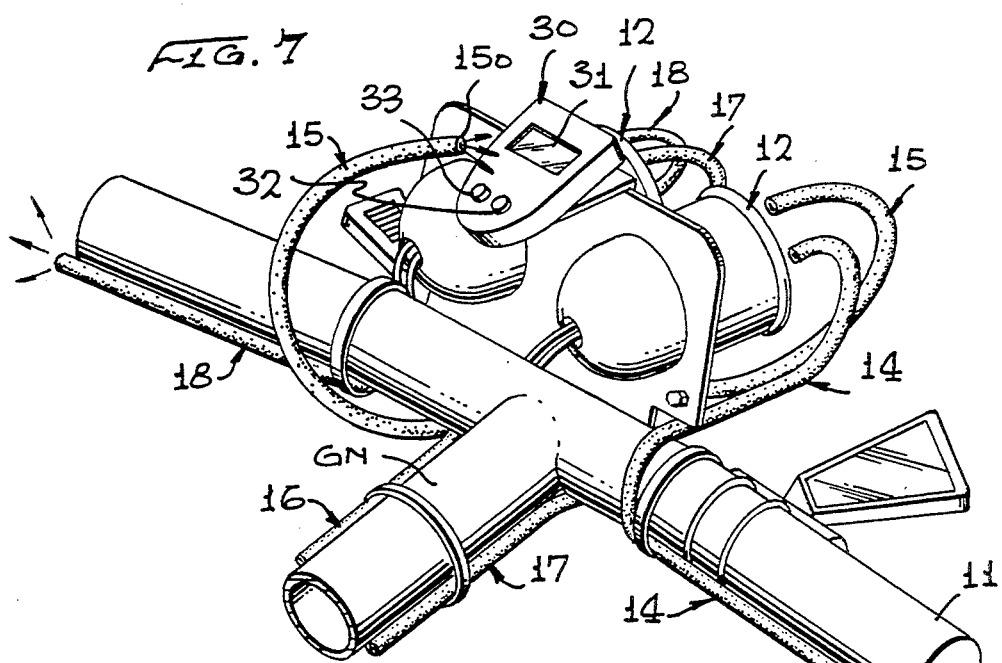
FIG. 7 is a perspective view of a bicycle computer with illumination by this invention.

Referring again to the embodiment of FIGS. 1 and 2, in combination with FIGS. 6, 6a and 7 a total of five fibre optic cables are shown with their input ends 14I–18I adjacent to one or two headlights 12. Fibre optic element 14 is routed back to the handle bar 11 and outward on the right head lamp 12 to provide illumination on the right side of the bicycle. Fibre optic element 18 extends from its input end 18I adjacent the left headlight 12 of FIG. 7 as viewed by the rider to the left end of the handle bar 11 providing light to the left side of the bicycle. Fibre optic element 15 curved to a position overhanging computer 30 FIGS. 2, 6 and 7 directed toward its readout screen 31 as well as control buttons 32 and 33 from the output end 15O, fibre optic element 15 may be directed by bending the sheath contained wire 15W so that the output end 15O is directed from the side towards the computer screen 31 but does not obscure the riders view nor the operation of the function buttons 32 or 33.

The remaining two fibre optic elements 16 and 17 as may be seen in FIG. 6A are routed rearward and directed toward desired locations for rear illumination. The fibre element 16 is directed rearward and downward and positioned near the derailleur 19, while fibre optic element 17 is conveyed virtually directly rearward toward and under the saddle 35 where its output end 17O is directed rearward. Each of the fibre optic elements used for illumination of the computer 30 and the derailleur 19, namely the element IS and 16 are transparent and provide white illumination. Fibre optic elements 14 and 18 directed to the side are preferably in yellow color accomplished by means of yellow indelible ink either at the output and input ends of the fibre optic element. The rear element 17 is indelible ink marked at its input and output end in red color.

Whenever the head lamp or lamps 12 are illuminated, illumination is provided:

| POSITION | COLOR |
| --- | --- |
| left and right | yellow |
| computer | white |
| rear | red |
| derailleur | white |

No additional power is consumed in providing this degree of lighting. The stiffness provided by the wires 14W-18W insure that each of the free standing portions of the elements 14-18 remains in the position selected by the user. These elements pass along a bicycle member such as the handle bars 11, or frame F or existing cable and where there is no movement, the fibre optic members are secured by any of various types of fasteners such as cable ties or by twisties applied carefully to the bicycle parts such as the handlebars 11, cables, headlight housing where necessary.

Figure 8:
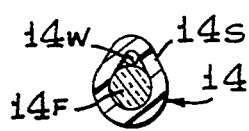
FIG. 8 is an enlarged input end view of a single fibre optic element (s) in FIGS. 4–5.
Figure 9:
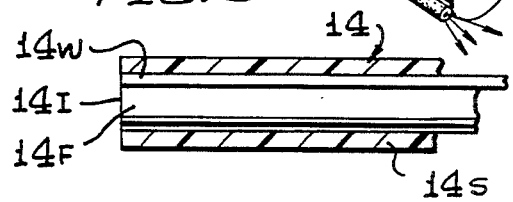
FIG. 9 is a side elevational view of the element of FIG. 8 with portions broken away.
Figure 8A:
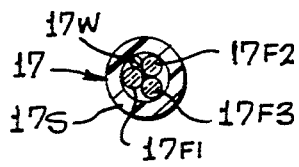
FIG. 8A is an end view of a three fibre optic element.
Figure 9A:
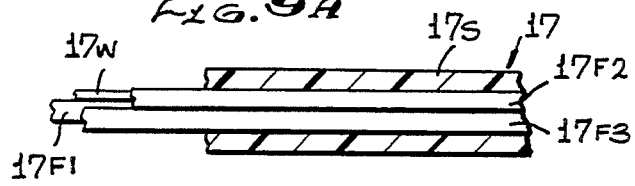
FIG. 9A is a side elevational view of the element of FIG. 8A with portions broken away for clarity.

The nature of the flexible but stiff optic elements allows them to be routed to whatever position the rider desires. The locations shown are illustrative. Additional positions may be added if the user desires. It is important that the ends of the fibre as well as the circular wall, particularly the input ends, output ends are smooth and sufficiently polished. The sheathes 14S-18S protect the walls from abrasions which would cause undesired light loss. The relationship of the preferred embodiment of the fibre optic rod 14f, the sheath 14s and the support wire 14 is shown in FIGS. 8 and 90 Where added flexability is needed, multiple fibre optic rods 17f1, 17f2 and 17f3, along with wire 17w are enclosed within sheath 17s as shown in FIGS. 8A and 9A.

INSTALLATION/OPERATION

We believe that incorporating fibre optics for use in the field of bicycle illumination is completely new. The available head lamp is the source of illumination. Positioning the face of a fibre optic cable as perpendicular as possible to the headlight and routing emitting cable end to a desired point of illumination provides a new concept in bicycle lighting. Operation is accomplished with virtually no maintenance required except for minor alignment or adjustment of optic rods by incorporating or employing bendable stiffness and cable ties to fasten the cable to strategic locations. Mounting becomes quick and simple on any bicycle.

The usefulness of applying fibre optic technology for illumination applications on bicycles would require a method for consumers of cutting and polishing optic rods in various lengths for different bicycle applications. Cutting the steel wire is easily accomplished with household wire cutters. To cut and polish, strip back outer housing, snip wire leaving wire approximately ⅛" or shorter than rods. Gently file down optics with fine sand paper emery board until you have a flat polished face.

Locate a piece of white typing or lined paper and place on a hard flat surface. Hold optics perpendicular on material applying light pressure and rub quickly back and forth for 15-20 seconds in circular motion. Check face and proceed until you have a sufficiently polished end.

Go back to bicycle and route the cable. Starting with the pick up in front of headlight, attach cable to a location that does not pivot when handlebars are turned. This is the most critical aspect of the installation. From there, attach cable to strategic locations with cable ties. Upon completion, we recommend you observe action of cable as handlebars are turned completely left or right as well as (compressing shocks) if applicable, to determine if cable will stay positioned during any and all conditions. Reposition as necessary. Turn headlight on and adjust pick up for maximum light output.

Once installed, there is no maintenance required. If an optic does get out of alignment, simply move face of cable to achieve maximum output.

The above described embodiments of the present invention are merely descriptive of its principals and are not to be considered limiting. The scope of the present invention instead shall be determined from the scope of the following claims including their equivalents.

What is claimed is:

1. In combination with a two wheeled vehicle having a headlight, a flexible light transfer conduit comprising:
    a tubular flexible sheath;
    a wire within said sheath;
    a fibre optic light conductor within said sheath;
    said light conductor having an input end positionable by said sheath and wire exposed to a source of illumination and having an output end for dispersing illumination;
    said fibre optic conduit positioned with the input end exposed to illumination from the vehicle headlight for transferring light from the headlight to various positions on the vehicle with minimal support at positions on said vehicle requiring illumination;
    the wire and fibre optic of the flexible light transfer conduit having sufficient stiffness to retain its shape after being bent whereby said conduit may be bent to place the output end adjacent to selected parts of the vehicle allowing said fibre optic conductor to transfer light through various shapes with minimal or no support.

2. In combination with a headlight and a two wheeled vehicle, a flexible fibre optic conduit comprising:
    a flexible length of resinous plastic material capable of carrying light from end to end;
    an elongated bendable stiffening element that can be bent and maintain desired shape; and
    a flexible plastic outer sheath confining said flexible length of light carrying material and said element as a flexible cable that can transfer light through a desired shape and retaining that shape thereafter; and
    means for securing one end positioned and directed toward the light emitting surface of the headlight and the second end directed toward a portion of the vehicle to be illuminated.

3. In combination with a bicycle having a frame, handle bars, a headlight and a saddle, an auxiliary lighting system comprising:
    fibre optic light conductor having an input end, an intermediate bendable portion and an output end;
    means positioning the input end of said fibre optic light conductor in front of the headlight of the bicycle;
    means securable to the frame of the bicycle for positioning and supporting said fibre optic light conductor;
    means stiffening the intermediate bendable portion of said fibre optic light conductor at least in the regions unsupported by the frame of the bicycle; and
    the output end of said fibre optic light conductor being exposed and directed by said stiffening means to provide illumination at a selected location on the bicycle remote from its headlight.

4. The combination in accordance with claim 3 wherein said stiffening means is secured to said fibre optics light conductor by an encircling continuous sheath.

5. The combination in accordance with claim 3 comprising an array of fibre optic light conductors each having an input end exposed to illumination from the headlight and an output end directed to provide illumination each in a different direction.

6. The combination in accordance with claim 5 including one fibre optic light conductor(s) having red coloration, said one fibre optic light conductor extending rearward on the frame of the bicycle to provide a tail light therefore.

7. In combination with a bicycle having a frame, handle bars, a headlight and a saddle, an auxiliary lighting system comprising:

fibre optic light conductor having an input end and an output end;

means positioning the input end of said fibre optic light conductor in front of the headlight of the bicycle;

means securable to the frame of the bicycle for positioning and supporting said fibre optic light conductors;

means stiffening said fibre optic light conductor at least in the regions unsupported by the frame of the bicycle;

the output end of said fibre optic light conductor being exposed to provide illumination at a location on the bicycle remote from its headlight;

comprising an array of fibre optic light conductors each having an input end exposed to illumination from the headlight and an output end directed to provide illumination each in a different direction;

including two fibre optic light conductors secured to the handlebars of the bicycle and providing side directed illumination from the handle bar.

8. The combination in accordance with claim 7 wherein said two fibre optic light conductors having lengths sufficient to extend to a portion of the handle bars to provide side lighting for the bicycle.

9. The combination in accordance with claim 3 for use with a bicycle having an instrument mounted in the region of the handlebars of the bicycle for viewing by the rider, a fibre optic light conductor having its output end positioned by said stiffening element to be directed toward the instrument but out of the sight path of the rider to the instrument.

10. The method for providing auxiliary illumination for a bicycle having a head light employing a fibre optic light conductor comprising the steps of:

cutting a fibre optic light conductor to the length sufficient to extend from an input end directed toward the illuminated face of the bicycle headlight to the output end at the point to be illuminated;

cutting a length of manually bendable wire substantially equal to the length of the fibre optic light conductor;

cutting a substantially equal length of heat shrinkable tubing having an inside dimension sufficient to receive the fibre optic light conductor and wire in a snug fit;

heat shrinking the tubing about the fibre optic light conductor and wire to form a bendable light conducting assembly;

polishing the ends of said fibre optic light conductor to provide efficient light reception and dispersion;

bending the intermediate portion assembly to conform to the bicycle parts to support the assembly;

securing the intermediate portions to the bicycle;

bending the input end region of the assembly to direct the input end toward the illumination from the headlight; and bending the output end region of the assembly to direct illumination therefrom in the desired direction.

* * * * *